United States Patent

Compton et al.

Patent Number: 5,092,723
Date of Patent: Mar. 3, 1992

[54] ENGINE CLIP BOLT

[75] Inventors: Clair E. Compton, Simi Valley; Jean-Paul A. Nicolle, Canoga Park, both of Calif.

[73] Assignee: VSI Corporation, Carson, Calif.

[21] Appl. No.: 591,955

[22] Filed: Oct. 2, 1990

Related U.S. Application Data

[60] Division of Ser. No. 511,999, Apr. 12, 1990, Pat. No. 4,974,274, which is a continuation of Ser. No. 374,479, Jun. 19, 1989, abandoned, which is a continuation of Ser. No. 253,706, Oct. 5, 1988, abandoned.

[51] Int. Cl.$^5$ .................................................. F16B 39/00
[52] U.S. Cl. .................................... 411/166; 411/396; 411/998
[58] Field of Search ............... 411/166, 169, 396, 400, 411/965, 999, 372, 107, 103, 998, 383, 398, 409, 368, 546

[56] References Cited

U.S. PATENT DOCUMENTS

| | | | |
|---|---|---|---|
| 469,261 | 2/1892 | Moran | 10/27 R |
| 824,333 | 6/1906 | Bassick | 411/998 X |
| 841,284 | 1/1907 | Tower | 411/998 X |
| 1,688,423 | 10/1928 | Jardine | 10/27 R |
| 3,451,456 | 6/1969 | Dey | 411/166 |
| 3,828,382 | 8/1974 | Nakamura | 10/27 R |
| 4,239,139 | 12/1980 | Bott | 411/409 X |
| 4,391,121 | 7/1983 | Taruntaev | 72/67 X |

FOREIGN PATENT DOCUMENTS

| | | | |
|---|---|---|---|
| 85145 | 3/1955 | Norway | 411/397 |
| 1278102 | 12/1986 | U.S.S.R. | 72/67 |

Primary Examiner—Rodney M. Lindsey
Attorney, Agent, or Firm—Christie, Parker & Hale

[57] ABSTRACT

Bolt material is orbitally swaged into recesses in the clip while simultaneously swaging bolt material over the clip to develop a torsional interference lock and an axial interference lock, respectively between the clip and the bolt. The recesses are arc shaped, have a center of curvature on a circle having a smaller diameter than a circle that defines lands between the recesses, and number between six and eight.

20 Claims, 3 Drawing Sheets

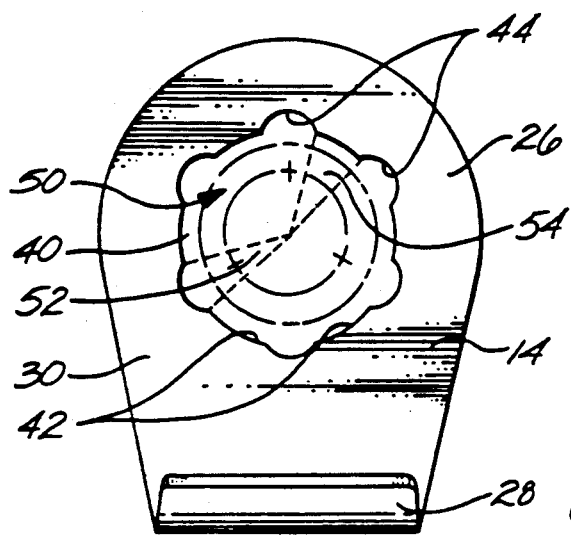
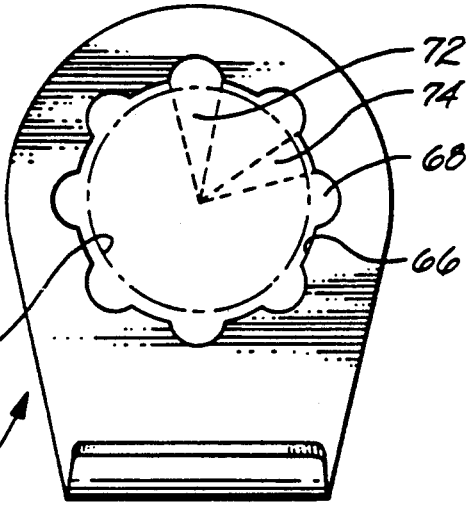
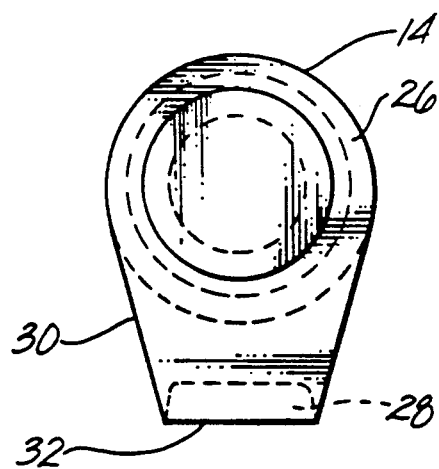

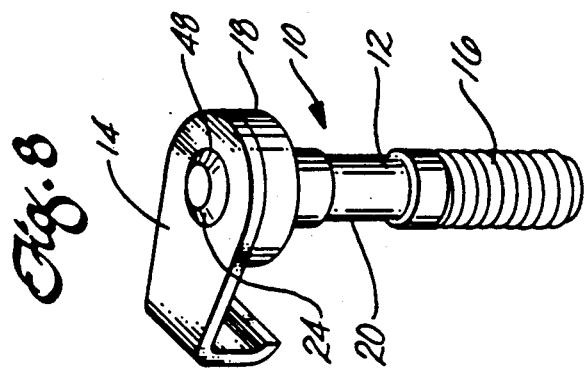
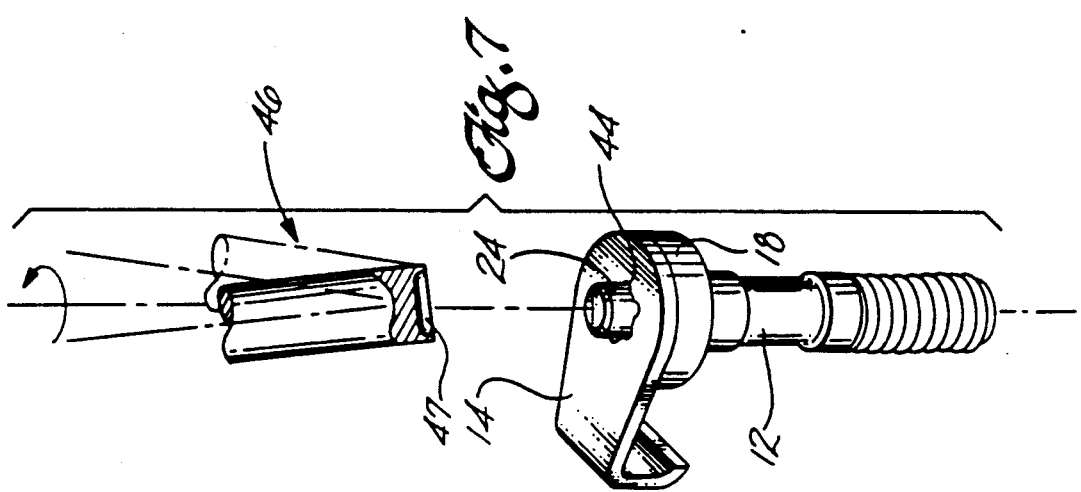
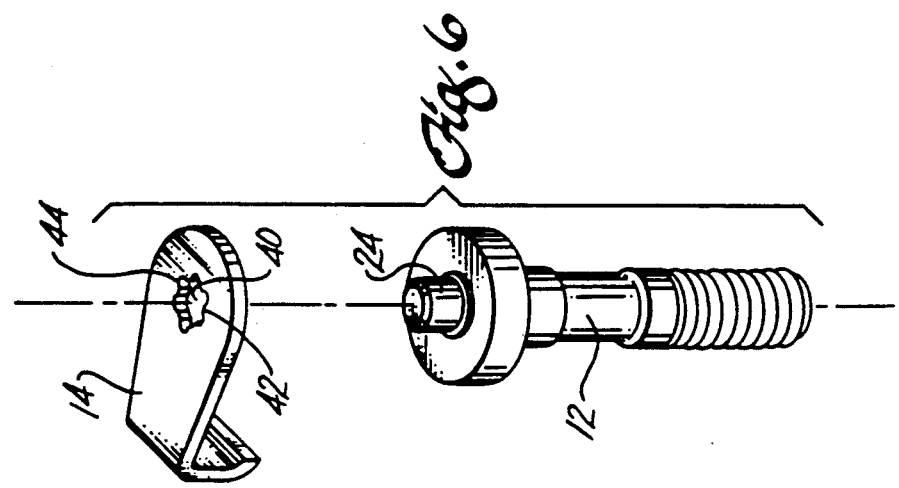

ENGINE CLIP BOLT

This is a division of U.S. Pat. application Ser. No. 07/511,999, filed Apr. 12, 1990, now U.S. Pat. No. 4,974,274, which is a continuation of U.S. patent application Ser. No. 07/374,479, filed June 30, 1989, now abandoned which is a continuation of U.S. patent application Ser. No. 07/253,706, filed Oct. 5, 1988 now abandoned.

BACKGROUND OF THE INVENTION

The present invention relates to fasteners in general, and, more in particular to engine clip bolts.

Engine clip bolts fasten parts of aircraft engines together. Clip bolts are used where the head of the bolts cannot be held during installation and removal. Clip bolts do not rotate during installation and removal of cooperating nuts. Clip bolts also are constrained axially before nut installation and after nut removal. With clip bolts, parts of an engine can be properly registered with respect to each other and the parts moved and rotated without the nuts being installed.

To prevent rotation of a clip bolt, its clip bears against structure of the engine. More specifically, each clip has an ear attached directly to its bolt and that extends laterally away from the bolt to a tang or hook that bends back towards the bolt. The bight of the hook mechanically interferes with the structure of the engine to keep the clip bolt from rotating during nut installation and removal. The nose of the hook axially interfers with the structure to keep the clip bolt with the engine structure even without the cooperating nut.

The clip should be reliably and strongly attached to its bolt. If the clip and bolt come rotationally unattached during installation and before the desired amount of tightening, the nut cannot be further tightened on the bolt, resulting in an unsatisfactory joint. Clips of the clip bolts cannot separate from the structure they are used with because of the danger that the clips will be ingested into the engine. To avoid the possibility of separation, the bolts use clips that stay with the bolt even if they become rotationally uncoupled.

Attaching the clip to the bolt presents problems. Welding the clip to the bolt can affect the metallurgy of both, and the reliability of the resulting joint is not always good. Welding is also an expensive procedure. Another approach used axially extending pins of the bolt that receive the clip and that are swaged to lock the clip to the bolt. Problems with this approach include expense and a high percentage of unreliable unions. A third approach uses an externally splined bolt that receives internal splines of the clip with the end of the bolt again swaged over the top of the clip to axially lock the two together. This third approach is also expensive because of the external splines on the bolt and because of the necessity to register the external and internal splines during assembly.

SUMMARY OF THE INVENTION

The present invention provides an improved engine clip bolt that inexpensively attaches the clip to the bolt with a strong joint. This strong joint results from an end of the bolt swaged into recesses in the perimeter of a hole in the clip and simultaneously swaged over the clip. The clip bolt is easily manufactured. Visual inspection of the completed clip bolt is reliable because adequate swage is visually obvious. Swaging is preferably by an orbital swaging tool that develops good radial as well as axial movement of swaged bolt material; with the good radial movement the amount of circumferential interference between the bolt and clip can be high and the amount of axial interference can also be high.

In its preferred form, the present invention provided a clip bolt where the rotational union between the clip and the bolt is at least as great as the break away torque between them but lower than the torsional strength of the bolt; this prevents tightening the clip bolt to bolt failure. Since the clip is axially attached to the bolt as well, if the torsional union between them should fail the clip still stays with the bolt.

In a specific form, the invention contemplates both a method for producing the clip bolt and the clip bolt itself. The method includes forming a bolt with a head proximate one end and a thread at the other end. A boss is formed on the head that extends axially from the head away from the threaded end. This boss is circular in radial cross-section. The method also contemplates forming a clip that has means such as a tang for engaging the structure in which the clip bolt is used to keep the clip bolt from rotating during the tightening or removal of a nut on the bolt thread. The clip also has an ear integral with the tang that has a circular hole of a diameter greater than the diameter of the boss. Recesses, preferably scallops, are formed in the perimeter of the hole to receive swaged boss material. The clip is placed on the bolt with the boss of the bolt in the hole of the clip and bearing against the bolt head. The boss is then heated. The boss is then swaged to expand it radially into the recesses to unite the clip and bolt rotationally with a mechanical lock. The swaging also expands boss material radially over the recesses and adjacent clip material to axially unite the clip and bolt with a mechanical lock.

Preferably, the recesses have perimeters defined by circular arcs that have a center of curvature lying on a circle that is concentric with and inside the circular hole. As stated above, we presently prefer to have the rotational lock at least as great as the torque at desired preload of a completed joint but less that the ultimate torsional strength of the bolt. In specific embodiments of this invention, this result follows when the recesses have circular arc shaped perimeters with the total of the distance between the recess along the perimeter of the circular hole about equal to the total distance across the mouths of the recesses measured along the same circle and with between six and eight recesses.

These and other features, aspects and advantages of the present invention will become more apparent from the following description, appended claims and drawings.

BRIEF DESCRIPTION OF THE DRAWINGS

FIG. 1 is a plan view of a clip of the clip bolt of the present invention;

FIG. 2 is a plan view of another embodiment of the clip of the clip bolt of the present invention;

FIG. 4 is a top plan view of the clip bolt of the present invention;

FIG. 6 is a perspective view of the clip and clip bolt of the present invention being assembled;

FIG. 7 is a perspective view similar to FIG. 6 illustrating an orbital swage that deforms the boss of the bolt to effect the completed clip bolt; and FIG. 8 is a perspective view of the completed clip bolt.

DETAILED DESCRIPTION

Figure 5:
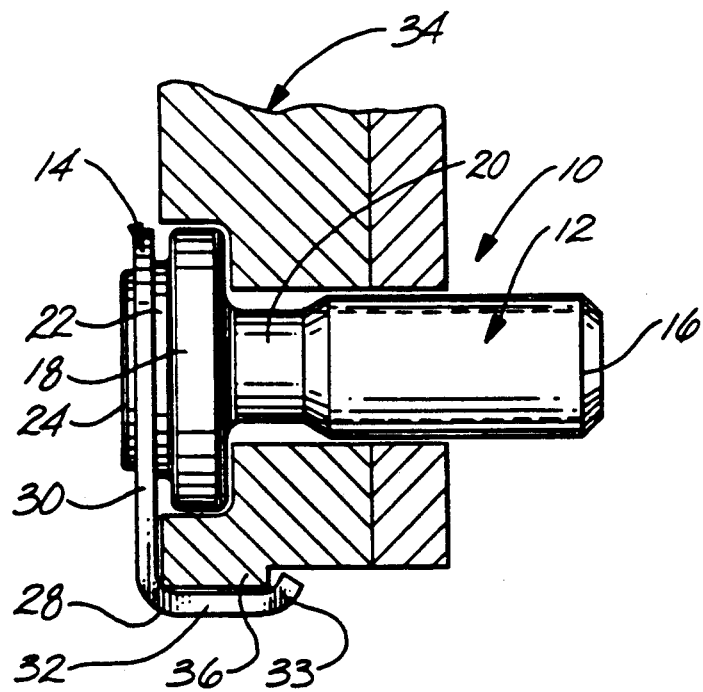
FIG. 5 is a side elevational view partly in section of the clip bolt of the present invention being installed.

FIG. 5 and 8 show a completed clip bolt of the present invention, and we will broadly describe the clip bolt with reference to these Figures. In these figures, a clip bolt 10 consists of a bolt 12 and a clip 14. The bolt has a thread 16 extending axially from one of its ends, and a head 18 at its other end. A shank 20 between the thread and the head has a diameter less than either. An optional shoulder or washer pad 22 of the head bears against the underside of clip 14. The shoulder has a diameter less than the head. A swaged boss 24 secures clip 14 to bolt 12.

With particular reference to FIGS. 1, 4 and 5, clip 14 includes an ear 26 and a tang or hook 28. The tang or hook joins ear 26 through a neck 30. The clip generally is planar, but with the tang bending away from the plane at one end. As seen best in FIG. 5, the tang bends back on itself to present a bight 32 and a re-entrant lip 33.

The tang of the clip installed in structure appears as in FIG. 5. There, structure 34 presents an external shoulder 36, and tang 28 extends around and in back of it with bight 32 torsionally coupling the clip bolt to the structure and lip 33 behind the shoulder.

In general, the configuration just described is in the prior art. Clip bolts are used in aircraft engines. The clip of each bolt prevents the bolt from turning during the tightening of a cooperating nut, now shown, onto thread 16. The clip also prevents rotation of the bolt during nut removal during engine service. The clip does this by bight 32 engaging shoulder 36. An axial constraint provided by lip 33 acting on shoulder 36 keeps the clip bolt in place to receive the nut. This axial constraint is important because the engine structures are often turned prior to installation of the nuts on the bolts. The clip and bolt are joined together so that the clip cannot rotate with respect to the bolt during the installation of the nut.

The present invention effects this rotational union as well as an axial union between the clip and bolt by orbital swaging. With reference to FIGS. 1 and 6, clip 14 has a hole 40. The hole has first sections or lands 42 that fall on a diameter of a common circle, the diameter being slightly larger than the diameter of unswaged boss 24 of bolt 12. A plurality of regularly spaced recesses 44 open into hole 40 at the circumference of the circle the section or lands fall onto. These recesses provide void volumes to receive swaged material from boss 24.

Before assembling the clip and the bolt and before swaging, it may be necessary to anneal the boss to make it ductile enough to swage.

With reference to FIG. 7, clip 14 and bolt 12 are assembled with the clip over boss 24 of the bolt and the ear of the clip bearing against head 18 of the bolt. Boss 24 extends away and clear from clip 14.

An orbital swaging tool, shown schematically at 46, swages boss 24 to move its material axially and radially. The tool has a die 47 that determines the final configuration of the swaged boss. The material of the boss moves radially into recesses 44 to provide the rotational, mechanical interference lock between the clip and the bolt. Swaged material also expands above the clip to provide an external cylindrical flange 48 (see FIG. 8) that bears against the clip and compressively holds the clip and the bolt head together.

Figure 3:
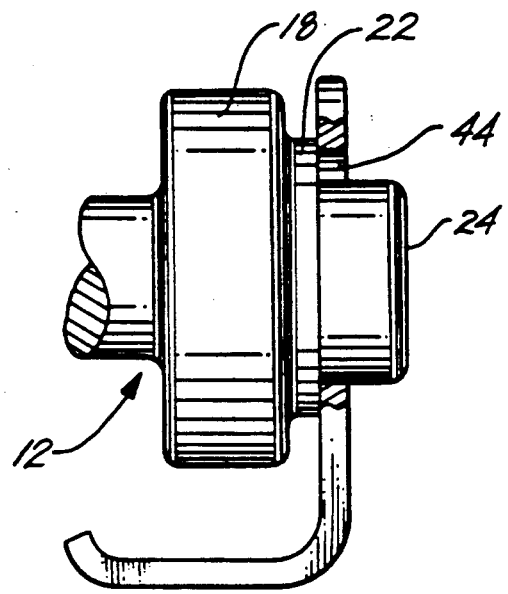
FIG. 3 is a view partly fragmented and partly in half section of the union of the clip and bolt of the clip bolt of the present invention.

FIG. 3 shows the relationship between the clip, bolt head and boss before swaging. There, boss 24 extends through hole 40. The boss has a diameter slightly less than the hole. One of the recesses 44 is shown opening into the hole and facing boss 24. FIG. 2 also shows clearly the clip bearing against shoulder 22, of head 18 of bolt 12.

In general, the strength of the union between the clip and the bolt in torsion should be greater than the torque at desired preload but less than the torsional strength of the bolt. As is well known, torque correlates with preload: the greater the torque, the greater the axial compressive load applied by the fastener system of the clip bolt and a nut to the structure. As has been mentioned before, the torsional strength of the mechanical lock between the clip and the bolt should be greater than the torque at predetermined preload, but less than the strength of the bolt. This effects a failure of the rotational lock before the bolt can fail. If the lock should fail in torsion after installation, the clip will still be retained with the bolt because of axial interference provided by swaged boss 24. With such a failure there would still be a good joint. If the torsional strength of the mechanical lock between the bolt and clip is higher than the torsional strength of the bolt and the bolt should fail, the joint will be bad and there can be loose parts that can be ingested into the engine.

We have found that the required strength of the torsional union between the bolt and clip can be produced by having recesses 44 six to eight in number. Each of the recesses preferably has a perimeter defined by an arch of a circle. With reference to FIG. 1, the defining circle has a center that falls on the circumference of an interior circle 50. Sections or lands 42 between the recesses fall on the circumference of the circle that defines hole 40. The interior circle is concentric to the circle that defines hole 40 and has a slightly smaller diameter. The mouth of each recess subtends an angle such that the sum of the subtended angles is about 180 degrees. This angle is shown at 52. Each land subtends an angel such that the sum of the subtended angles is about 180 degrees. One of these angles is shown at 54. In other words, the mouths of the recesses occupy a distance along the same circle about equal to the distance along the circle between the recesses and occupied by the lands. FIG. 1 shows six of the recesses in the form of scallops.

FIG. 2 shows a variation of the clip with eight recesses. There a clip 64 has a hole 66 and eight recesses 68. Each of the recesses has a center of curvature that falls on a circle 70. Circle 70 is concentric with hole 66. Each recess subtends an angle 72. Each land subtends an angle 74. The total of the subtended dangles of the recesses about equals the total of the subtended angles of the lands.

The clip bolt of this invention provides a very reliable joint: the parts do not come apart. The bolt is also economical to produce. The use of a cylindrical boss and swaging that boss into scallops in the clip means that the clip can be located at any rotational position with respect to the boss; something which is not easy to do with and external and internal spline arrangement, especially if they are in interference. The scallops with swaged boss material in them provide considerably more resistance to torsion than the prior art clip bolt that utilizes three pins extending through three cooperating holes of the clip. The swaged head of the clip provides a good visual assurance that the clip and bolt have been properly joined. The reliability of this visual inspection is greater that visual inspection of a welded connection between a clip and a bolt and does not have the disadvantages of adversely affecting the metallurgy of the part and is less expensive.

The present invention has been described with reference to a certain preferred embodiment. The spirit and the scope of the appended claims should not, however, necessarily be limited to the foregoing description.

We claim:

1. An improved engine clip bolt comprising:
   (a) a bolt having a first and a second end, a male thread extending from the first end toward the second end, a head proximate the second end and having the largest diameter of the bolt, and a boss extending from the head to the second end; and
   (b) a clip attached to the bolt and having a tang for engaging the structure in which the clip bolt is used to keep the bolt from rotating, and an ear integral with the clip, the ear having a hole through it with scallops in its periphery, the boss filling the hole and its scalloped periphery and overlying the ear circumferentially between scallops to rotationally and axially attach the clip to the bolt, the torsional strength of the union between the clip and the bolt being at least as great as the torsion on the bolt at a predetermined preload that the bolt can apply to a structure but less than the ultimate torsional strength of the bolt.

2. The improved clip bolt claimed in claim 1 wherein there are between six and eight of the scallops.

3. The improved clip bolt claimed in claim 2 wherein each of the scallops has a circular perimeter and opens into the hole along a chord of less than the diameter of the circle of the perimeter.

4. The improved clip bolt claimed in claim 3 wherein the head has a shoulder of reduced diameter bearing against the clip.

5. The improved clip bolt claimed in claim 4 wherein the boss over the clip overlies the scallops and the clip between the scallops.

6. The improved clip bolt claimed in claim 1 wherein each of the scallops has a circular perimeter and opens into the hole along a chord of less than the diameter of the circle of the perimeter.

7. The improved clip bolt claimed in claim 1 wherein the head has a shoulder of reduced diameter bearing against the clip.

8. The improved clip bolt claimed in claim 1 wherein the boss over the clip overlies the scallops and the clip between the scallops.

9. An engine clip bolt comprising:
   a bolt having a threaded shank, an enlarged head at one end of the shank, a central boss extending above the head; and
   a clip attached to the bolt and having a tang for engaging structure in which the bolt is used, for preventing rotation of the bolt, and an ear integral with the tang,
   the ear having a hole with a perimeter having from six to eight recesses having a larger radial dimension from the axis of the bolt alternating with six to eight portions having a smaller radial dimension from the axis of the bolt,
   the boss filling all of the hole, including the recesses, and having a portion overlying a portion of the ear around the hole for axially attaching the clip to the bolt, p1 the torsional strength of the union between the clip and the bolt head being less than the torsion required to shear the boss from the bolt head so that the clip stays with the bolt in the event the torsional union between the clip and the bolt fails, and also less than the ultimate torsional strength of the bolt.

10. An engine clip bolt as recited in claim 9 wherein the recesses in the perimeter are rounded.

11. An engine clip bolt as recited in claim 10 wherein each of the recesses has a perimeter defined by a circular arc having a center of curvature lying on a circle concentric with the circular hole and having a smaller diameter than the circular hole.

12. An engine clip bolt as recited in claim 9 wherein the hole in the clip is in the form of a circle between the recesses with the total distance betwen the recesses along the perimeter of the circular hole being about equal o the total distance across the mouths of the recesses.

13. An engine clip bolt comprising:
   a bolt having a first end and a second end, a male thread extending from the first end toward the second end, a head proximate the second end and having the largest diameter of the bolt, and a boss extending from the head to the second end; and
   a clip attached to the bolt and having a tang for engaging the structure in which the clip bolt is used to keep the bolt from rotating, and an ear integral with the clip, the ear having a circular hole through it with recesses in its periphery, the boss filling the hole and its recessed periphery and overlying the ear circumferentially between the recesses to rotationally and axially attach the clip to the bolt, with the total distance between the recesses along the perimeter of the circular hole being about equal to the total distance across the mouths of the recesses.

14. An engine clip bolt as recited in claim 13 wherein the number of recesses is in the range of from six to eight.

15. An engine clip bolt as recited in claim 13 wherein each of the recesses has a circular perimeter and opens into the hole along a chord of less than the diameter of the circular hole.

16. An engine clip bolt as recited in claim 13 wherein the bolt has a shoulder of reduced diameter between the head and the boss and bearing against the clip.

17. An engine clip bolt comprising:
   a bolt having a first end and a second end, a male thread extending from the first end toward the second end, a head proximate the second end and having the largest diameter of the bolt, and a boss extending from the head to the second end; and
   a clip attached to the bolt and having a tang for engaging the structure in which the clip bolt is used to keep the bolt from rotating, and an ear integral with the clip, the ear having a hole through it with curved scallops in its periphery, the boss filling the hole and its scalloped periphery and overlying the ear circumferentially between scallops to rotationally and axially attach the clip to the bolt, the torsional strength of the union between the clip and the bolt being less than the torsion required to shear the boss from the bolt head so that the clip stays with the bolt in the event the torsional union between the clip and the bolt fails, and also less than the ultimate torsional strength of the bolt.

18. An engine clip bolt as recited in claim 17 wherein each of the scallops has a perimeter defined by a circular arc having a center of curvature lying on a circle concentric with the circular hole and having a diameter less than the diameter of the circular hole.

19. An engine clip bolt as recited in claim 17 wherein the hole in the clip between the scallops is in the form of a circle with the total distance between the scallops along the perimeter of the circular hole being about equal to the total distance across the mouths of the scallops.

20. An engine clip bolt as recited in claim 19 wherein the number of scallops is in the range of from six to eight.

* * * * *